(12) United States Patent
Lee et al.

(10) Patent No.: US 10,508,183 B2
(45) Date of Patent: Dec. 17, 2019

(54) PLASTIC FILM AND A METHOD FOR MANUFACTURING SAME

(71) Applicant: LG CHEM, LTD., Seoul (KR)

(72) Inventors: Han Na Lee, Daejeon (KR); Young Suk Kim, Daejeon (KR); Yeong Rae Chang, Daejeon (KR); Heon Kim, Daejeon (KR); Soon Hwa Jung, Daejeon (KR); Jin Seok Byun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 228 days.

(21) Appl. No.: 15/508,862

(22) PCT Filed: Sep. 16, 2015

(86) PCT No.: PCT/KR2015/009738
§ 371 (c)(1),
(2) Date: Mar. 3, 2017

(87) PCT Pub. No.: WO2016/043526
PCT Pub. Date: Mar. 24, 2016

(65) Prior Publication Data
US 2017/0283573 A1      Oct. 5, 2017

(30) Foreign Application Priority Data

Sep. 18, 2014  (KR) .................. 10-2014-0124473
Sep. 18, 2014  (KR) .................. 10-2014-0124475
(Continued)

(51) Int. Cl.
*C08J 7/18*       (2006.01)
*B32B 1/00*       (2006.01)
(Continued)

(52) U.S. Cl.
CPC .................. *C08J 7/18* (2013.01); *B05D 3/06* (2013.01); *B32B 1/00* (2013.01);
(Continued)

(58) Field of Classification Search
CPC .................................... B32B 1/00; C08J 7/18
See application file for complete search history.

(56) References Cited

U.S. PATENT DOCUMENTS 7,589,130 B2  9/2009  Hongo et al.
7,989,523 B2  8/2011  Sato et al.
(Continued)

FOREIGN PATENT DOCUMENTS

JP     2002-265615 A    9/2002
JP     2006-052260 A    2/2006
(Continued)

*Primary Examiner* — Catherine A. Simone
(74) *Attorney, Agent, or Firm* — Dentons US LLP

(57) ABSTRACT

The present invention relates to a plastic film and a method for manufacturing same. A plastic film, which is formed such that at least one part has a curved shape, can have high hardness, impact resistance, scratch resistance and high transparency. The plastic film is light and will not be easily damaged by external pressure and thus can substitute for the existing glass and is expected to be used for various electronic products such as a display and the like. In particular, the plastic film has at least one part in a curved shape and thereby is expected to be used for products in various shapes which cannot be manufactured by means of the existing glass. Moreover, a method for manufacturing a plastic film enables manufacturing of a plastic film having at least one part in a curved shape without curls or cracks as well as simultaneous performing of heat molding and heat curing, thereby increasing the productivity of a plastic film.

9 Claims, 3 Drawing Sheets

US 10,508,183 B2
Page 2

(30) Foreign Application Priority Data

Sep. 18, 2014 (KR) ........................ 10-2014-0124476
Sep. 15, 2015 (KR) ........................ 10-2015-0130566

(51) Int. Cl.

| | | |
|---|---|---|
| C08L 63/00 | (2006.01) | |
| B05D 3/06 | (2006.01) | |
| C08F 222/10 | (2006.01) | |
| C08G 59/22 | (2006.01) | |
| C08G 59/24 | (2006.01) | |
| C08J 7/04 | (2006.01) | |
| B05D 7/04 | (2006.01) | |

(52) U.S. Cl.
CPC ...... *C08F 222/1006* (2013.01); *C08G 59/226* (2013.01); *C08G 59/24* (2013.01); *C08J 7/047* (2013.01); *C08L 63/00* (2013.01); *B05D 3/067* (2013.01); *B05D 7/04* (2013.01); *B05D 2252/10* (2013.01); *B05D 2701/00* (2013.01); *C08F 2222/104* (2013.01); *C08F 2222/1026* (2013.01); *C08J 2369/00* (2013.01); *C08J 2435/02* (2013.01); *C08J 2447/00* (2013.01); *C08J 2463/00* (2013.01); *C08J 2463/10* (2013.01); *C08J 2467/04* (2013.01); *C08L 2205/05* (2013.01)

(56) References Cited

U.S. PATENT DOCUMENTS

| | | | |
|---|---|---|---|
| 8,084,131 B2 | 12/2011 | Oka | |
| 8,377,623 B2 | 2/2013 | Fong | |
| 8,937,116 B2 | 1/2015 | Kim et al. | |
| 9,233,495 B2 | 1/2016 | Kim et al. | |
| 9,243,160 B2 | 1/2016 | Kim et al. | |
| 9,387,610 B2 | 7/2016 | Kim et al. | |
| 2009/0047531 A1 | 2/2009 | Bartley et al. | |
| 2009/0291248 A1 | 11/2009 | Hongo et al. | |
| 2015/0086907 A1* | 3/2015 | Mizuta | G03H 1/0248 430/2 |
| 2015/0140279 A1 | 5/2015 | Kang et al. | |
| 2016/0024341 A1 | 1/2016 | Kang et al. | |

FOREIGN PATENT DOCUMENTS

| | | |
|---|---|---|
| JP | 2007-119542 A | 5/2007 |
| JP | 2010-008659 A | 1/2010 |
| JP | 4543441 B2 | 9/2010 |
| JP | 2010-284910 A | 12/2010 |
| JP | 2011-509313 A | 3/2011 |
| JP | 2011-126921 A | 6/2011 |
| JP | 2012-214610 A | 11/2012 |
| JP | 2015-066778 A | 4/2015 |
| KR | 10-0616221 B1 | 8/2006 |
| KR | 10-2009-0028815 A | 3/2009 |
| KR | 10-2010-0023826 A | 3/2010 |
| KR | 10-2010-0026013 A | 3/2010 |
| KR | 10-2010-0041992 A | 4/2010 |
| KR | 10-2011-0092797 A | 8/2011 |
| KR | 10-2011-0092800 A | 8/2011 |
| KR | 10-2011-0092818 A | 8/2011 |
| KR | 10-2012-0117481 A | 10/2012 |
| KR | 10-2013-0049154 A | 5/2013 |
| KR | 10-2013-0117189 A | 10/2013 |
| KR | 10-2013-0135156 A | 12/2013 |
| KR | 10-2014-0113426 A | 9/2014 |
| WO | WO-2013161524 A1 * | 10/2013 ........... G03H 1/0248 |

\* cited by examiner

[FIG. 1]
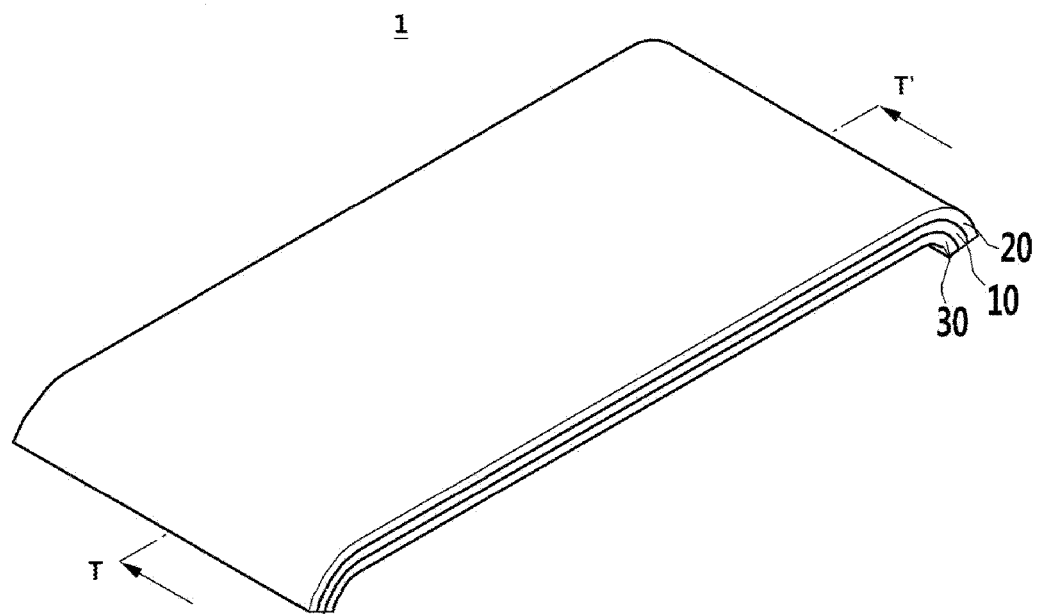
[FIG. 2]
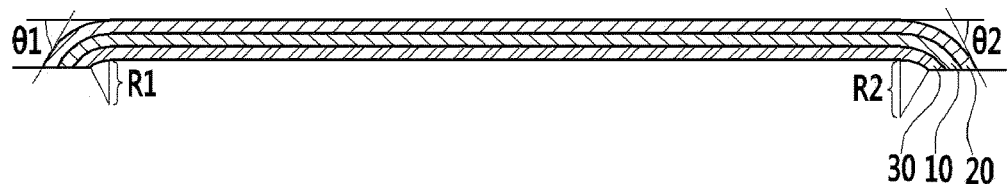

[FIG. 3]
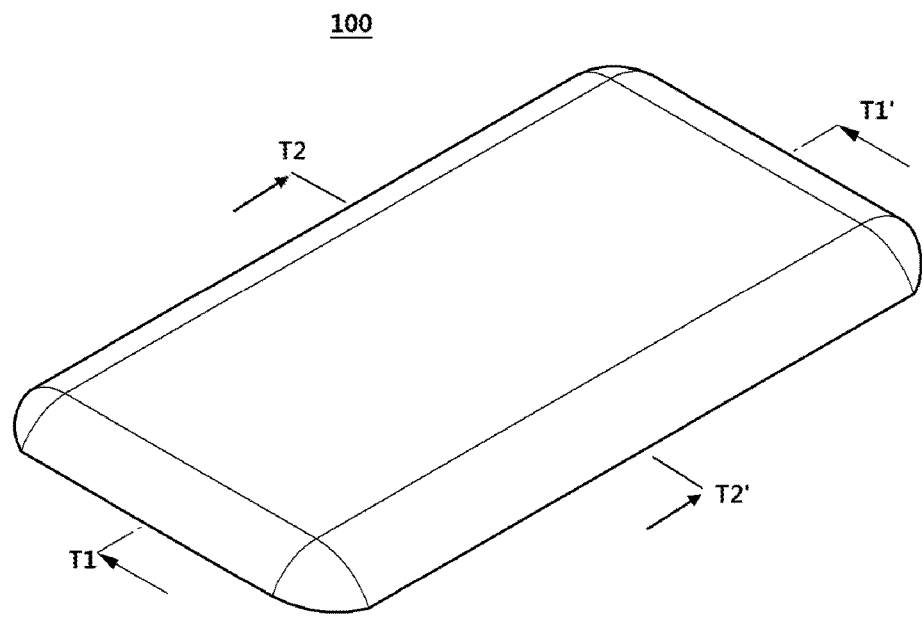
[FIG. 4]
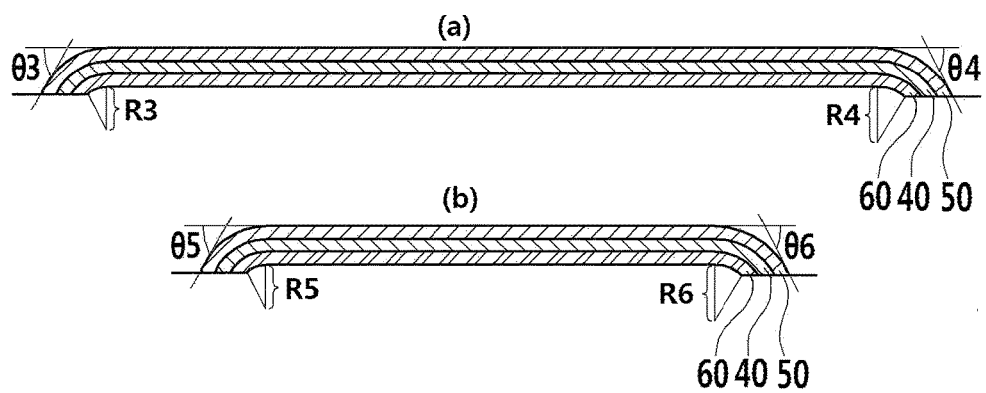

[FIG. 5]
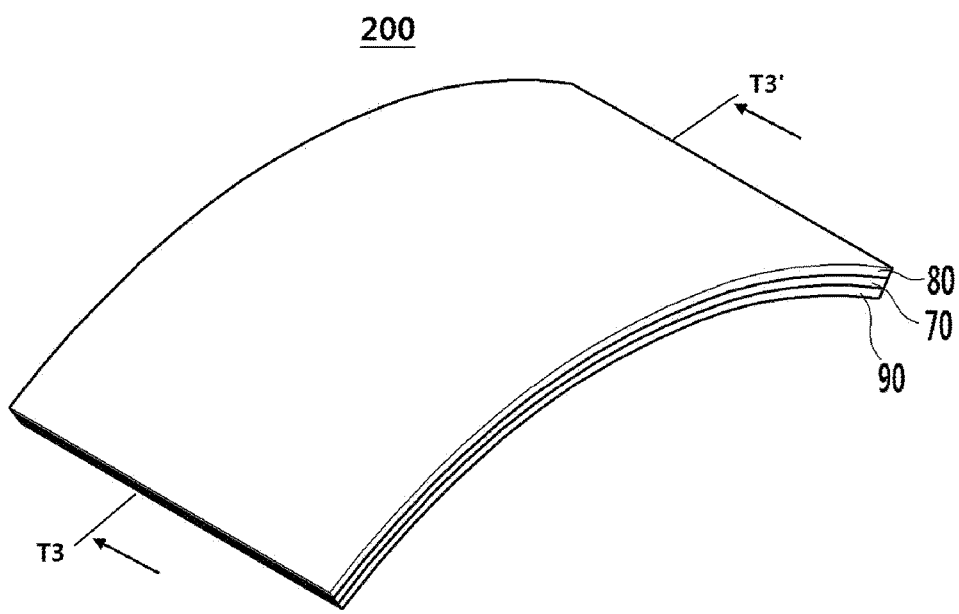
[FIG. 6]
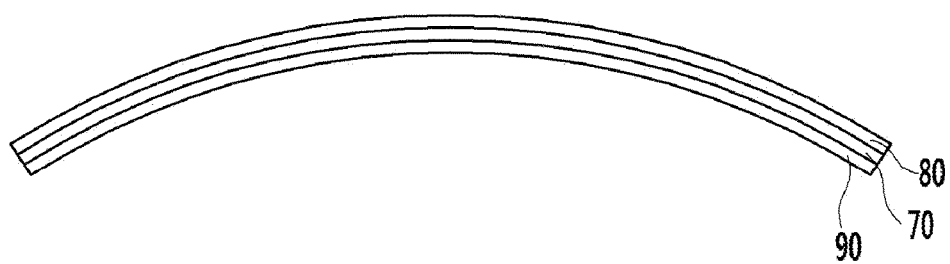

PLASTIC FILM AND A METHOD FOR MANUFACTURING SAME

CROSS REFERENCE TO RELATED APPLICATION(S)

This application is a National Stage Application of International Application No. PCT/KR2015/009738 filed on Sep. 16, 2015, which claims the benefit of Korean Patent Application No. 10-2014-0124473 filed on Sep. 18, 2014, Korean Patent Application No. 10-2014-0124475 filed on Sep. 18, 2014, Korean Patent Application No. 10-2014-0124476 filed on Sep. 18, 2014 and Korean Patent Application No. 10-2015-0130566 filed on Sep. 15, 2015, all of which are hereby incorporated by reference in their entirety for all purposes as if fully set forth herein.

TECHNICAL FIELD

The present invention relates to a plastic film and a method for preparing the same.

BACKGROUND

With the recent development of mobile devices such as a smart phone and a tablet PC, slimming and thinning of a substrate for a display are required. On the display window or front plate of such a mobile device, glass or tempered glass are generally used as material having excellent mechanical properties. However, glass causes heavy weight of a mobile device due to its own weight, and has a problem of damage by external impact.

Thus, plastic resin is being studied as material that can be used instead of glass. A plastic resin film is light-weighted and has little concern about damage, and thus, is suitable for a tendency to pursue lighter mobile devices. Particularly, in order to achieve a film having high hardness and abrasion resistance, a film in which a hard coating layer consisting of plastic resin is coated on a substrate is being suggested.

As a method for improving the surface hardness of the hard coating layer, increasing the thickness of the hard coating layer may be considered. In order to secure surface hardness to such a level that can be used instead of glass, it is necessary to realize a certain thickness of the hard coating layer. However, as the thickness of the hard coating layer increases, although surface hardness may increase, wrinkles or curls may be increased due to cure shrink of the hard coating layer, and simultaneously, crack or peel of the hard coating layer may be easily generated, and thus, it is not easy to practically apply.

Patent Document 1 discloses a plastic film using binder resin comprising UV curable polyurethane acrylate-based oligomer without monomers. However, the disclosed plastic film has pencil hardness of about 3H, which is not sufficient for replacing a glass panel of a display.

Meanwhile, a display device in which a part of the edge is curved for esthetic, functional reasons, or a display having a generally curved three-dimensional shape is recently receiving attention, and such a tendency is remarkable particularly in mobile devices such as a smart phone, a table PC. However, in case glass is used as a cover plate for protecting such as display of a three-dimensional shape, there is a high risk of damage due to the heavy weight and vulnerablility to external impact of glass.

Although a plastic resin film is light-weighed and has less concern about damage than glass, it is not easy to prepare a film having a three-dimensional structure and exhibiting high hardness of glass level.

PRIOR ART

Korean Laid-Open Patent Publication No. 10-2010-0041992 (publication date: 2010 Apr. 23)

DISCLOSURE

Technical Problem

It is an object of the present invention to provide a plastic film.

It is another object of the present invention to provide a method for preparing the plastic film.

Technical Solution

According to one embodiment of the invention, a plastic film of at least partially curved shape, comprising a substrate and a coating layer formed on at least one side of the substrate, said coating layer comprising (i) cationically curable resin, which is a cured product of cationically curable compounds comprising, based on the total weight of the cationically curable compounds, 60 wt % to 100 wt % of 3,4,3',4'-diepoxybicyclohexyl, and (ii) radically curable resin, is provided.

The plastic film according to one embodiment may comprise a substrate having a glass transition temperature of 80 to 250° C.

And, the plastic film may comprise carionically curable resin, which is a cured product obtained by heat curing of cationically curable compounds by a cationic polymerization initiator comprising a cation of the following Chemical Formula 1:

   [Chemical Formula 1]

in the Chemical Formula 1, $A^1$ is N, P or S, $R^1$ is a C1-20 alkyl or a C2-20 alkenyl radical, $R^2$ is a C1-20 alkyl, a C2-20 alkenyl, a C6-30 aryl, a C7-35 alkylaryl or a C7-35 arylalkyl, or a radical in which a hydroxyl, a C1-20 alkyl, a C2-20 alkenyl, a C6-30 aryl, a C7-35 alkylaryl, or a C7-35 arylalkyl is linked to the above radical by a single bond, —O—, —S—, —CO—, —COO— or —OCO—, and k is 2 or 3.

The plastic film may comprise radically curable resin, which is a cured product of multifunctional acrylate. Here, the multifunctional acrylate, for example, may include one or more selected from the group consisting of hexanediol diacrylate, hexanediol dimethacrylate, tripropyleneglycol di acrylate, tripropyleneglycol dimethacrylate, ethyleneglycol di acrylate, ethyleneglycol dimethacrylate, trimethylolpropane triacrylate, trimethylolpropane trimethacrylate, trimethylolpropane ethoxylate triacrylate, glycerin propoxylate triacrylate, pentaerythritol triacrylate, pentaerythritol trimethacrylate, pentaerythritol tetraacrylate, pentaerythritol tetramethacrylate, dipentaerythritol hexaacrylate and dipentaerythritol hexamethacrylate.

The coating layer of the plastic film may exhibit pencil hardness of 4H or more under a load of 1.0 kg, when the thickness of the coating layer is 100 μm. And, the coating layer may exhibit haze of 1% or less, when the thickness of the coating layer is 100 μm.

The plastic film of at least partially curved shape, for example, may have a shape in which, among four edges, two facing edges are curved, a shape in which all four edges are curved, or a generally curved shape.

If the plastic film has a structure where coating layers are formed on both sides of a substrate, (iii) elastic polymer may be included in any one coating layer of the coating layers. More specifically, the plastic film may have a structure where on one side of the substrate, a coating layer comprising (i) cationically curable resin, which is a cured product of cationically curable compounds comprising, based on the total weight of the cationically curable compounds, 60 wt % to 100 wt % of 3,4,3',4'-diepoxybicyclohexyl, and (ii) radically curable resin, may be formed, and on the other side of the substrate, a coating layer comprising (i) cationically curable resin, which is a cured product of cationically curable compounds comprising, based on the total weight of the cationically curable compounds, 20 wt % to 100 wt % of 3,4,3',4'-diepoxybicyclohexyl, (ii) radically curable resin, and (iii) elastic polymer, may be formed.

Such a plastic film may exhibit high hardness, high transparency and impact resistance, and so on, and be used instead of glass.

Meanwhile, according to another embodiment of the invention, a method for preparing a plastic film of at least partially curved shape, comprising the steps of: coating a curable composition comprising cationically curable compounds, radically curable compounds, a cationic polymerization initiator and a radical polymerization initiator on one side or both sides of a substrate, and partially photo-curing to obtain a semi-cured product; and thermoforming the semi-cured product and heat curing it, wherein the cationically curable compounds comprises, based on the total weight of the cationically curable compounds, 60 wt % to 100 wt % of 3,4,3',4'-diepoxybicyclohexyl, is provided.

In the preparation method according to another embodiment, the cationic polymerization initiator may comprise a cation of the following Chemical Formula 1:

   [Chemical Formula 1]

in the Chemical Formula 1, $A^1$ is N, P or S, $R^1$ is a C1-20 alkyl or a C2-20 alkenyl radical, $R^2$ is a C1-20 alkyl, a C2-20 alkenyl, a C6-30 aryl, a C7-35 alkylaryl or a C7-35 arylalkyl, or a radical in which a hydroxyl, a C1-20 alkyl, a C2-20 alkenyl, a C6-30 aryl, a C7-35 alkylaryl, or a C7-35 arylalkyl is linked to the above radical by a single bond, —O—, —S—, —CO—, —COO— or —OCO—, and k is 2 or 3.

In the Chemical Formula 1, $R^1$ may be methyl, ethyl, propyl or allyl, and $R^2$ may be phenyl, naphthyl, benzyl, hydroxyphenyl, acetylphenyl, acetyloxyphenyl, methylbenzyl, or naphthyl methyl.

Meanwhile, in the step of obtaining the semi-cured product, the curable composition is coated to form an uncured coating layer, and the uncured coating layer is partially photocured to obtain a semi-cured product. Here, in order to partially photocure the uncured coating layer, light irradiation conditions may be appropriately controlled.

More specifically, the step of obtaining the semi-cured product may be carried out by coating the curable composition to form an uncured coating layer, and irradiating light to the uncured coating layer so that, based on the total curable functional groups of the radically curable compounds included in the uncured coating layer, about 80 to 100 mol % of the curable functional groups may be cured.

Alternatively, the step of obtaining the semi-cured product may be carried out by coating the curable composition to form an uncured coating layer, and irradiating light to the uncured coating layer so that, based on the total curable functional groups of the cationically curable compounds included in the uncured coating layer, about 20 to 50 mol % of the curable functional groups are cured.

In order to achieve the above cure degree, in the step of obtaining the semi-cured product, the curable composition may be coated to form an uncured coating layer, and UV may be irradiated to the uncured coating layer at 100 to about 2,000 mJ/cm².

Meanwhile, a plastic film having coating layers on both sides may be prepared by the preparation method according to another embodiment.

Specifically, in order to prepare the above described plastic film, in the step of obtaining the semi-cured product, a first curable composition may be coated on one side of a substrate and partially photo-cured to form a first semi-cured coating layer, and then, a second curable composition may be coated on the other side of the substrate and partially photo-cured to form a second semi-cured coating layer. Here, as at least one of the first and second curable compositions, a curable composition comprising cationically curable compounds comprising, based on the total weight of the cationically curable compounds, 60 wt % to 100 wt % of 3,4,3',4'-diepoxybicyclohexyl, radically curable compounds, a cationic polymerization initiator, and a radical polymerization initiator may be used to provide a plastic film aimed in the present invention.

For example, the first and second curable compositions may be curable compositions comprising cationically curable compounds comprising, based on the total weight of the cationically curable compounds, 60 wt % to 100 wt % of 3,4,3',4'-diepoxybicyclohexyl, radically curable compounds, a cationic polymerization initiator, and a radical polymerization initiator, and the first and second curable compositions may be identical to or different from each other.

For another example, one of the first and second curable compositions may be a curable composition comprising cationically curable compounds comprising, based on the total weight of the cationically curable compounds, 60 wt % to 100 wt % of 3,4,3',4'-diepoxybicyclohexyl, radically curable compounds, a cationic polymerization initiator, and a radical polymerization initiator, and the other composition may be a curable composition comprising cationically curable compounds comprising, based on the total weight of the cationically curable compounds, 20 wt % to 100 wt % of 3,4,3',4'-diepoxybicyclohexyl, radically curable compounds, a cationic polymerization initiator, a radical polymerization initiator, and elastic polymer.

The semi-cured product obtained through the step of obtaining a semi-cured product may be thermoformed and heat cured at a temperature of 90 to 250° C. through the step of thermoforming and heat curing.

Advantageous Effects

The plastic film according to one embodiment of the invention is formed in such a way that at least a part of the film has a curved shape, and may exhibit high hardness, impact resistance, scratch resistance, and high transparency. Since such a plastic film is light and has no concern about damage by external pressure, it is expected to be used in various electronic products such as a display, and so on, instead of the existing glass. Particularly, the plastic film is expected to provide products of various shapes that could be provided by the existing glass, through the at least partially curved shape.

And, the preparation method of the plastic film can prepare a plastic film of at least partially curved shape without generation of curls and cracks, and can simultaneously conduct thermoforming and heat curing, thus increasing productivity of the above explained plastic film.

BRIEF DESCRIPTION OF THE DRAWING

FIG. 1 is a perspective view of the plastic film according to one embodiment.

FIG. 2 is a cross sectional view showing the cross section of the plastic film when cut in a thickness direction along the line connecting T and T' of FIG. 1.

FIG. 3 is a perspective view of the plastic film according to another embodiment.

FIG. 4 is a cross sectional view of the plastic film of FIG. 3, wherein (a) is a cross sectional view showing the cross section of the plastic film when cut in a thickness direction along the line connecting T1 and T1' of FIG. 3, and (b) is a cross sectional view showing the cross section of the plastic film when cut in a thickness direction along the line connecting T2 and T2' of FIG. 3

FIG. 5 is a perspective view of the plastic film according to yet another embodiment.

FIG. 6 is a cross sectional view showing the cross section of the plastic film when cut in a thickness direction along the line connecting T3 and T3' of FIG. 5.

DETAILED DESCRIPTION OF THE EMBODIMENTS

Hereinafter, a plastic film and a method for preparing the same according to specific embodiments of the invention will be explained.

As used herein, the term "curable composition" means a compound that can be polymerized, cross linked or cured by heat and/or light, and unless otherwise indicated or separately modified, it is intended to include both light curable compounds and thermally curable compounds. And, as used herein, "polymerization, cross-linking or curing" means that curable compounds are bonded by various chemical reactions to form polymer with higher molecular weight, and polymerization, cross-linking or curing may be used as the same meaning.

According to one embodiment of the invention, a plastic film of at least partially curved shape, comprising a substrate and a coating layer formed on at least one side of the substrate, said coating layer comprising (i) cationically curable resin, which is a cured product of cationically curable compounds comprising, based on the total weight of the cationically curable compounds, 60 wt % to 100 wt % of 3,4,3',4'-diepoxybicyclohexyl, and (ii) radically curable resin, is provided.

Glass is transparent and has excellent mechanical properties, and thus, is mainly used in a display, and so on. However, since glass is heavy and easily broken by external impact, it does not satisfy customer requirement for light and thin displays.

Thus, there are continued attempts to realize transparency and hardness of glass with a plastic film that is light-weighted and has little concern about damage. However, a plastic film should have low tackness, high elongation and appropriate tensile properties, and so on, so that it can be cured and molded under severe conditions. Unless such properties are not fulfilled, a plastic film may be broken during a curing and molding processes due to cure shrinkage, or cracks may be generated in a plastic film during a molding process, or a plastic film may be adhered to a mold, and so on, and thus, cannot be molded into a desired shape. Moreover, if a plastic film fulfils all the properties required in curing and molding, it is not easy to exhibit high hardness after curing.

However, the present inventors found out that if cationically curable resin and radically curable resin are included together, and particularly, the cationically curable resin is prepared using a specific epoxy compound beyond a certain amount, a plastic film of a three-dimensional shape that realizes high transparency and high hardness of glass and has little concern about generation of curl or crack due to the excellent processibility can be provided, and completed the present invention. Thus, using the plastic film, it is expected to provide a display of a curved shape that could not be obtained through the existing glass.

The substrate used in the plastic film according to one embodiment may be a transparent substrate commonly used in the technical field to which the present invention pertains. For example, as the substrate, a substrate prepared from resin having a glass transition temperature of about 80 to 250° C. or about 100 to 150° C. may be used. Such a substrate enables preparation of a plastic film exhibiting excellent thermal stability and durability, without concern about degeneration of the properties of a coating layer, when preparing the plastic film according to one embodiment, particularly in the thermoforming process.

Specifically, the kind of the resin is not specifically limited as long as it has a glass transition temperature of the above explained range, That is, both non-drawn substrate and drawn substrate prepared using resin having a glass transition temperature of the above explained range may be used. More specifically, as the substrate, for example, substrates prepared from polyester such as polyethylene terephthalate (PET), cyclic olefin polymer (COP), cyclic olefin copolymer (COC), polyacrylate (PAC), polycarbonate (PC), polymethylmethacrylate (PMMA), polyetheretherketon (PEEK), polyethylene naphthalate (PEN), polyetherimide (PEI), polyimide (PI), triacetylcellulose (TAC) or fluorinated resin, and so on, may be used. The substrate may consist of single layer, or two or more layers each consisting of identical or different material, as necessary.

Although the thickness of the substrate is not specifically limited, it may be controlled to about 100 to about 1000 μm or about 200 to about 800 μm considering the hardness and processibility of the plastic film.

Meanwhile, the coating layer is formed by coating a curable composition (hereinafter, referred to as curable composition HC) comprising cationically curable compounds comprising, based on the total weight of the cationically curable compounds, 60 to 100 wt % of 3,4,3',4'-diepoxybicyclohexyl, a cationic polymerization initiator, radically curable compounds, a radical polymerization initiator on a substrate, and curing it. Thus, the coating layer comprises (i) cationicaly curable resin formed by curing of cationically curable compounds comprising, based on the total weight of the cationically curable compounds, 60 to 100 wt % of 3,4,3',4'-diepoxybicyclohexyl, by a cationic polymerization initiator, and (ii) radically curable resin obtained by curing of radically curable compounds by a radical polymerization initiator.

Hereinafter, the curable composition HC will be explained in detail.

The curable composition HC comprises 3,4,3',4'-diepoxybicyclohexyl as a cationically curable compound. The 3,4,3',4'-diepoxybicyclohexyl can secure a certain distance between the molecules even after curing, by the bicyclohexyl group inside the molecule. Thus, cure shrinkage that can be generated when curing a radically curable compound may be compensated to prevent generation of curl in the plastic film. And, 3,4,3',4'-diepoxybicyclohexyl can form a coating layer that has a rapid curing speed and high crosslinking density. As the result, the curable composition HC can provide a plastic film with high hardness of glass level without degradation of appearance property due to uncured components.

The 3,4,3',4'-diepoxybicyclohexyl may be included in the content of 60 wt % to 100 wt %, 70 wt % to 100 wt %, 80 wt % to 100 wt %, or 90 wt % to 100 wt %, based on total weight of the cationically curable compounds included in the curable composition HC. If the content of 3,4,3',4'-diepoxybicyclohexyl is less than the above range, when preparing a plastic film of a curved shape, hardness may be lowered and thermoformability may be degraded.

The curable composition HC may further comprise epoxy compounds other than 3,4,3'4'-diepoxybicyclohexyl as cationically curable compounds within a range that does not damage high transparency, high hardness and excellent processibility. As non-limiting examples, as other epoxy compounds, compounds having one or more epoxy groups in the molecule may be further included. Specifically, other epoxy compounds may be an aromatic, an alicyclic or an aliphatic compound having one or more epoxy groups in the molecule. Preferably, an aliphatic compound may be used as other epoxy compound, wherein the aliphatic compound may comprise one or two or more rings, and two or more rings may be simply linked with each other or linked by other linking group or linked in a fused form while sharing one or more carbon atoms. The kind of the aliphatic compound is not specifically limited, and it may be a compound having 3 to 90 carbon number. As non-limiting examples, the alicyclic compound may include (3',4'-epoxycyclohexane)methyl 3,4-epoxycyclohexyl carboxylate, and so on.

The cationically curable compounds may be included in the content of 30 to 90 parts by weight, 40 to 90 parts by weight, 50 to 90 parts by weight or 50 to 80 parts by weight, based on 100 parts by weight of the curable composition HC. The cationically curable compounds can provide a plastic film that not only realizes high hardness of glass level and but also exhibits excellent thermoformability, and so on, and thus, can be used instead of glass.

The curable composition HC may comprise a cationic polymerization initiator comprising a cation of the following Chemical Formula 1 so as to cure the cationically curable compound.

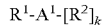 [Chemical Formula 1]

in the Chemical Formula 1, $A^1$ is N, P or S, $R^1$ is a C1-20 alkyl or a C2-20 alkenyl radical, $R^2$ is a C1-20 alkyl, a C2-20 alkenyl, a C6-30 aryl, a C7-35 alkylaryl or a C7-35 arylalkyl, or a radical in which a hydroxyl, a C1-20 alkyl, a C2-20 alkenyl, a C6-30 aryl, a C7-35 alkylaryl, or a C7-35 arylalkyl is linked to the above radical by a single bond, —O—, —S—, —CO—, —COO— or —OCO—, and k is 2 or 3.

Unless otherwise limited, the following terms are defined as follows.

Halogen may be fluorine (F), chlorine (Cl), bromie (Br) or iodine (I).

A C1-20 alkyl may be linear, branched or cyclic alkyl. Specifically, the C1-20 alkyl may be C1-20 linear alkyl; C1-10 linear alkyl; C1-5 linear alkyl; C3-20 branched or cyclic alkyl; C3-15 branched or cyclic alkyl; or C3-10 branched or cyclic alkyl. More specifically, the C1-20 alkyl may be methyl, ethyl, n-propyl, iso-propyl, n-butyl, iso-butyl, tert-butyl, n-pentyl, iso-pentyl, or cyclohexyl group, and so on.

A C2-20 alkenyl may be linear, branched or cyclic alkenyl. Specifically, the C2-20 alkenyl may be C2-20 linear alkenyl, C2-10 linear alkenyl, C2-5 linear alkenyl, C3-20 branched alkenyl, C3-15 branched alkenyl, C3-10 branched alkenyl, C5-20 cyclic alkenyl or C5-10 cyclic alkenyl. More specifically, the C2-20 alkenyl may be ethenyl, propenyl, butenyl, pentenyl or cyclohexenyl, and so on.

A C6-30 aryl means monocyclic, bicyclic or tricyclic aromatic hydrocarbon. Specifically, the C6-30 aryl may be phenyl, naphthyl or anthracenyl group, and so on.

A C7-35 alkylaryl means aryl of which at least one hydrogen is substituted with alkyl. Specifically, the C7-35 alkylaryl may be methylphenyl, ethylphenyl, n-propylphenyl, iso-propylphenyl, n-butylphenyl, iso-butylphenyl, tert-butylphenyl or cyclohexylphenyl, and so on. A C7-35 arylalkyl means alkyl of which at least on hydrogen is substituted with aryl. Specifically, the C7-35 arylalkyl may be benzyl, phenylpropyl, or phenylhexyl, and so on.

The cation of the Chemical Formula 1 comprises a group selected from C1-20 alkyl and C1-20 alkenyl (R' in the Chemical Formula 1), and thus, can easily generate acid by heat. The cation of the Chemical Formula 1 may also generate acid by light.

Specifically, in the Chemical Formula 1, $R^1$ may be methyl, ethyl, propyl, or allyl(prop-2-en-1-yl), and so on.

In the Chemical Formula 1, if $A^1$ is N or P, k becomes 3 and the cation of the Chemical Formula 1 may be ammonium cation or phosphonium cation. Meanwhile, in the Chemical Formula 1, if $A^1$ is S, k becomes 2 and the cation of the Chemical Formula 1 may be sulfonium cation.

In the Chemical Formula 1, $R^2$ may be defined as explained above, and the curable composition HC may comprise various initiators that can initiate a cationic polymerization reaction by heat. In the Chemical Formula 1, plural $R^2$ may be identical or different radicals.

Specifically, $R^2$ may be phenyl, naphthyl, benzyl, hydroxyphenyl, acetylphenyl, acetyloxypheny, methylbenzyl or naphthylmethyl, and so on.

The cationic polymerization initiator comprises an anion ionically bonding to the cation of the Chemical Formula 1. The kind of the anion is not specifically limited. As non-limiting examples, the catoinic polymerization initiator may comprise an anion selected from the group consisting of $PF_6$, $SbF_6$ and $B(C_6F_5)_4$.

The cationic polymerization initiator comprises the cation of the Chemical Formula 1, and San-Aid SI-B3, SI-B3A, SI-B2A, SI-60L, SI-100L, SI-110L, and so on, manufactured by Sanshin Chemical industry Co., Ltd may be used.

The cationic polymerization initiator may be included in the content of 0.01 to 5 parts by weight, 0.01 to 3 parts by weight, 0.01 to 1 part by weight, or 0.1 to 1 part by weight, based on 100 parts by weight of the curable composition HC. The cationic polymerization initiator may be used within the above explained range to begin an appropriate cationic polymerization reaction without property degradation of a plastic film formed from the curable composition HC.

The curable composition HC may comprise radically curable compounds to provide a plastic film exhibiting high hardness and abrasion resistance of glass level.

The radically curable compounds may be monomers that can be cured by free radical generated from a radical polymerization initiator. Among them, multifunctional acrylate may be used as the radically curable compound so that it may be combined with the cationically curable compound to provide a plastic film with high hardness and abrasion resistance. The multifunctional acrylate means a compound including two or more acryloyl groups or two or more methacryloyl groups.

Specifically, as the multifunctional acrylate, for example, multifunctional acrylate in which the equivalent weight of acryloyl groups and methacryloyl groups is about 50 to 500 g/eq, about 50 to 400 g/eq, about 50 to 300 g/eq, about 50 to 200 g/eq or about 50 to 150 g/eq, may be used. Such multifunctional acrylate may provide a plastic film with high hardness through thermoforming, with a low possibility of generating cracks at the time of thermoforming.

More specifically, as the multifunctional acrylate, one or more selected from the group consisting of hexanediol diacrylate, hexanediol dimethacrylate, tripropyleneglycol diacrylate, tripropyleneglycol dimethacrylate, ethyleneglycol diacrylate, ethyleneglycol dimethacrylate, trimethylolpropane triacrylate, trimethylolpropane trimethacrylate, trimethylolpropane ethoxylate triacrylate, glycerin propoxylate triacrylate, pentaerythritol triacrylate, pentaerythritol trimethacrylate, pentaerythritol tetraacrylate, pentaerythritol tetramethacrylate, dipentaerythritol hexaacrylate and dipentaerythritol hexamethacrylate may be used.

The radically curable compound may be included in the content of 5 to 60 parts by weight, 5 to 50 parts by weight, or 10 to 40 parts by weight, based on 100 parts by weight of the curable composition HC. The curable composition HC comprising the radically curable compound in the above explained content range exhibits low tackness in a semi-cured state, and thus, is easy to thermoform, can effectively prevent generation of cracks in a plastic film by cure shrinkage at the time of thermoforming or bending of a plastic film to an unwanted direction, and can provide a plastic film exhibiting high hardness and abrasion resistance.

As the radical polymerization initiator for initiating a polymerization reaction of such radically curable compounds, various radical polymerization initiators known in the technical field to which the present invention pertains may be used. Particularly, as the radical polymerization initiator, initiators capable of generating free radical by light may be used.

Specifically, as the radical polymerization initiator, 1-hydroxy-cyclohexylphenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, or bis(2,4,6-trimethylbenzoyl)-phenylphosphine oxide, and so on, may be used. And, as currently commercially available products, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and so on, may be used. The above listed initiators may be used alone or two or more kinds thereof may be used in combination.

The radical polymerization initiator may be included in the content of 0.01 to 5 parts by weight, 0.01 to 3 parts by weight, 0.01 to 1.5 parts by weight or 0.1 to 1 part by weight, based on 100 parts by weight of the curable composition HC. The radical polymerization initiator may be used in the above explained content range to begin an appropriate radical polymerization reaction without degradation of the properties of a plastic film formed from the curable composition.

In the curable composition HC, the cationically curable compounds and the radically curable compounds may be included in the weight ratio of 9:1 to 1:9, 9:1 to 4:6, 9:1 to 5:5, or 8:2 to 6:4. Thus, a coating layer formed from the curable composition HC may comprise the cationically curable resin and the radically curable resin at a weight ratio of 9:1 to 1:9, 9:1 to 4:6, 9:1 to 5:5 or 8:2 to 6:4. If the curable composition HC comprises the cationically curable resin and the radically curable resin at the above explained weight ratio, it may exhibit low tackiness and thus may be easily thermoformed, and a coating layer of high hardness can be provided without generation of curl and crack at the time of thermoforming and heat curing. Since the cationically curable compound and the radically curable compound do not show a significant different in the molecular weights after curing, the coating layer formed from the above explained composition may comprise (i) cationically curable resin and (ii) radically curable resin at a weight ratio of 9:1 to 1:9, 9:1 to 4:6, 9:1 to 5:5 or 8:2 to 6:4.

The curable composition HC may further comprise other additives commonly used in the technical field to which the present invention pertains, besides the above explained cationically curable compound, cation polymerization initiator, radically curable compound and radical polymerization initiator. Such additives may include inorganic particles, an antioxidant, an organic solvent, an UV absorber, a surfactant, a leveling agent, an antifouling agent, and so on.

Specifically, the curable composition HC may further comprise inorganic particles so as to improve hardness of a plastic film. As such inorganic particles, for example, nanoparticles having a particle diameter of about 100 nm or less, about 10 to about 100 nm, or about 10 to about 50 nm may be used. As non-limiting examples, as the inorganic particles, silica particles, aluminum oxide particles, titanium oxide particles or zinc oxide particles, and so on, may be used. Such inorganic particles may be included in the content of about 80 parts by weight or less, based on 100 parts by weight of the curable composition HC.

And, the curable composition HC may further comprise an antioxidant so as to inhibit yellowing of the plastic film obtained from the composition or during polymerization of the composition. Examples of the antioxidant may include a phenol-based antioxidant, an aromatic amine-based antioxidant or a phosphate-based antioxidant, and so on, and specific examples thereof may include 2,6-di(t-butyl)-4-methylphenol or tris(nonylphenyl) phosphate, and so on. Such an antioxidant may be included in the content of about 5 parts by weight or less or about 1 part by weight or less, based on 100 parts by weights of the curable composition HC.

If the components included in the curable composition HC are uniformly mixed and the composition has an appropriate viscosity and good coatability, the curable composition HC may not comprise a solvent. For example, the viscosity of the curable composition HC may be controlled to about 1,200 cps or less at 25° C., thus exhibiting appropriate flowability and coatibility. If it is difficult to uniformly mix the curable composition HC or the viscosity of the curable composition HC is too high, an organic solvent may be further added to the curable composition HC. Examples of the organic solvent may include alcohol such as methanol, ethanol, isopropylalcohol, butanol; alkoxy alcohol such as 2-methoxyethanol, 2-ethoxyethanol, 1-methoxy-2-propanol; ketone-based solvents such as acetone, methylethylketone, methylisobutylketone, methylpropylketone, cyclohexanone; ether-based solvents such as propylene glycol monopropyl ether, propylene glycol monomethyl ether, ethylene glycol momoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, diethylene glycol-2-ethylhexyl ether; aromatic solvents such as benezene, toluene, xylene, and so on, and the above listed solvents may be used alone or in combination of two or more kinds thereof. The content of the organic solvent may be appropriately controlled within a range that does not degrade the properties of the curable composition HC.

The curable composition HC can provide the plastic film according to one embodiment through the process of photocuring and heat curing.

Specifically, according to another embodiment of the invention, a plastic film of at least partially curved shape can be prepared by coating a curable composition (curable composition HC) comprising cationically curable compounds comprising, based on the total weight of the cationically curable compound, 60 wt % to 100 wt % of 3,4,3',4'-diepoxybicyclohexyl, a cationic polymerization initiator, radically curable compounds and a radical polymerization initiator on one side or both sides of a substrate, and partially photo-curing to obtain a semi-cured product; and thermoforming and heat curing the semi-cured product. In the preparation method, using the curable composition HC, a plastic film of a three-dimensional shape with high hardness and high transparency can be prepared with a lowered possibility of curl or crack generation.

Hereinafter, a method for preparing a plastic film using the curable composition HC will be explained in detail.

The curable composition HC may be coated on one side or both sides of the substrate, as necessary. If the curable composition HC is coated on both sides of the substrate, the curable composition HC may be coated on one side of the substrate and then the curable composition HC may be coated on the other side of the substrate; or the curable composition HC may be simultaneously coated on both sides of the substrate. The compositions of the curable compositions HC coated on both sides of the substrate may be identical or different.

The substrate has been previously explained in detail, and the detailed explanations are omitted here.

And, the curable composition HC may be coated on a substrate through various methods known in the technical field to which the present invention pertains. As non-limiting examples, the curable composition may be coated by bar coating, knife coating, roll coating, blade coating, die coating, micro gravure coating, comma coating, slot die coating, rib coating, or solution casting, and so on.

The curable composition HC may be coated such that the thickness after completely cured may become about 20 μm or more, about 20 to about 500 μm, about 20 to about 400 μm, about 20 to about 300 μm, about 50 to about 200 μm or about 50 to about 150 μm. Although the existing plastic film used instead of glass was very thickly prepared so as to realize surface hardness and abrasion resistance, and so on, by using the curable composition HC, even if a plastic film with a thickness of the above range is prepared, high hardness and excellent abrasion resistance can be realized. However, the coating thickness of the curable composition HC is not limited to the above explained range. The curable composition HC can compensate for the problem of incomplete photocuring even if a thick plastic film is prepared, by preparing a plastic film through curing by heat and light. Thus, a plastic film with excellent mechanical properties regardless of the thickness can be prepared using the curable composition HC.

As explained above, a plastic film of a curved shape can be prepared from the curable composition HC, by coating the curable composition HC on a substrate, irradiating light to semi-cure, fixing to a desired shape, and then, heating.

Specifically, as explained above, a partially cured (or semi-cured) coating layer may be obtained by coating the curable composition on a substrate to obtain an uncured coating layer, and irradiating light thereto. Here, the intensity and amount of light irradiated to the uncured coating layer may be controlled such that the obtained partially cured coating layer may become a state that can be thermoformed.

Specifically, the intensity and amount of light irradiated to the uncured coating layer may be controlled such that based on the total curable functional groups of the cationically curable compounds included in the uncured coating layer, about 20 to 50 mol % of the curable functional groups may be cured, and based on the total curable functional groups of the radically curable compounds, about 80 to 100 mol % or about 90 to 100 mol % of the curable functional groups may be cured. The mole number of the cured curable functional groups may be confirmed through infrared spectrometer.

In order to obtain a semi-cured coating layer with such a degree of cure, UV may be irradiated to the uncured coating layer at the intensity of about 100 to about 2,000 mJ/cm$^2$, about 100 to about 1,000 mJ/cm$^2$, about 100 to about 500 mJ/cm$^2$. And, the UV irradiation time may be appropriately controlled according to the thickness and area of the uncured coating layer, and so on. As non-limiting examples, the UV irradiation time may be controlled to about 30 seconds to 15 minutes, or about 1 minute to about 10 minutes. Under these conditions, a coated film that exhibits low tackness and thus can be thermoformed without sticking to a mold or surface deformation, can be obtained. And, a semi-cured coating layer prepared under these conditions has flexibility and can be easily curved to a desired shape, and thus, can be easily molded to a three-dimensional shape without curl or crack.

As a light source that can be used in the light irradiation process, various light sources known in the technical field to which the present invention pertains can be used. As non-limiting examples, a high pressure mercury lamp, a metal halide lamp, a black light fluorescent lamp, and so on, can be used.

In case the curable composition HC has been coated only one side of a substrate to obtain a semi-cured coating layer, the curable composition HC may be coated again on the other side of the substrate and the above explained process may be repeated once again to form semi-cured coating layers on both sides of a substrate.

If a plastic film in which the same coating layers are formed on both sides of the substrate is to be prepared, the previously used curable composition HC may be coated again on the other side of the substrate, and the above explained method may be repeated once again to form semi-cured coating layers on both sides of the substrate.

However, if a plastic film in which different coating layers are formed on both sides of the substrate is to be prepared, a curable composition HC that is different from the previously used curable composition HC may be coated on the other side of the substrate, and the above explained method may be repeated once again to form semi-cured coating layers on both sides of the substrate.

Meanwhile, if a semi-cured coating layer is obtained through the above explained process, the semi-cured coating layer is fixed to a desired shape and heat is applied. Specifically, a mold capable of realizing a desired shape is prepared and heat is applied while the semi-cured coating layer is fixed to a desired shape.

Here, if the semi-cured coating layer is formed from the curable composition HC comprising a cationic polymerization initiator comprising a cation of the Chemical Formula 1, it may be heat cured at the time of thermoforming. Thus, by conducting the existing two-step reaction at one time, the productivity of a plastic film may be further improved.

Specifically, the semi-cured coating layer is positioned on the prepared mold, and is fixed to a desired shape. Thereafter, the semi-cured coating layer that has been fixed to a desired shape may be placed at a certain temperature for a certain time, thus simultaneously progressing thermoforming and heat curing. Here, the heating temperature may be controlled to about 90 to about 250° C. or about 100 to about 150° C. And, the heating time may be controlled for about 30 seconds to about 600 seconds or about 120 seconds to about 300 seconds. Within such ranges, a possibility of not obtaining a plastic film of a desired shape by the restoring force of the substrate may be lowered, and deterioration of various properties of the plastic film due to the property change of the substrate may be prevented. However, heating temperature and time are not limited thereto, and may be appropriately controlled according to the kind and thickness of a substrate, the thickness of a semi-cured coating layer, a shape to be formed, pressure applied from a mold, and so on.

For example, thermoforming and heat curing may be performed by heating one pair of male and female molds to a certain temperature, and positioning the semi-cured coating layer between the one pair of male and female molds and closely contacting them, And, thermoforming and heat curing may be performed by positioning the semi-cured coating layer on one mold among one pair of male and female molds and applying vacuum or air pressure to closely contact them. Here, for more efficient thermoforming, certain pressure, for example, pressure of about 100 to 1500 kgf/cm$^2$ or about 300 to 1000 kgf/cm$^2$ may be applied to the semi-cured coating layer.

However, the thermoforming and heat curing process is not limited thereto, and if a plastic film in which only the edge is curved is to be prepared, a bar, and so on, other than a mold can be used to fix and thermoforming and heat curing may be performed so that the edge of the semi-cured coating layer is fixed to a desired shape.

If heat is applied to the semi-cured coating layer through the thermoforming and heat curing process, acid is generated from the cationic polymerization initiator included in the semi-cured coating layer and the cationically curable compounds may be heat cured. Particularly, 3,4,3',4'-diepoxybi-cyclohexyl or oligomer derived therefrom included in the semi-cured coating layer forms a cured product of a high cross-linking density at a rapid speed by the cationic polymerization initiator containing the cation of the Chemical Formula 1 that easily generates acid under thermoforming process conditions. Thus, since the semi-cured coating layer is sufficiently cured during the thermoforming process, a separate heat curing process may be omitted. And, by forming a coating layer of a high cross-linking density, a plastic film of high hardness can be provided.

For example, when the thickness of the coating layer prepared according to the above explained method is 100 µm, it may exhibit pencil hardness of 4H or more, 5H or more, or 6H or more under a load of 1.0 kg. The upper limit of the pencil hardness is not specifically limited, and for example, it may be 9H or less. However, since pencil hardness may vary according to the preparation conditions such as the thickness of the coating layer and cure degree, and so on, the above property may be measured for a coating layer that is formed by curing a curable composition HC and coating it on a substrate to a thickness of 100 µm, irradiating UV of 200 mJ/cm$^2$ to photocure, and heat curing at a temperature of 100 to 130° C. Regarding the details of the measuring method of pencil hardness, the method described in Examples below may be referred to.

And, the coating layer may exhibit haze of 1% or less or 0.5% or less, when the thickness of the coating layer is 100 µm. The lower limit of haze is not specifically limited, and for example, it may be 0%. In the same manner as pencil hardness, haze may be measured for a coating layer prepared under the above explained conditions. Regarding the details of the measuring method of haze, the methods described in the examples below may be referred to.

In order to exhibit pencil hardness and/or haze of the above range, a cured layer of a high cross-linking density should be formed at a rapid speed. Thus, it can be confirmed from the pencil hardness and haze properties that the curable composition according to one embodiment realizes sufficiently rapid curing speed and high cross-linking density.

In addition, by thermoforming and heat curing the semi-cured coating layer as explained above, a plastic film that not only realizes high transparency and high hardness like glass but also has minimized generation of curl and crack, can be provided.

The plastic film prepared through thermoforming and heat curing as explained above, may be aged at room temperature for about 24 hours or more for shape stabilization.

Meanwhile, if a plastic film has coating layers on both sides of a substrate, and the coating layers are different from each other, only on coating layer may be formed by the curable composition HC. Thus, a coating layer may be formed from the curable composition HC on one side of the substrate, and a coating layer may be formed from a curable composition different from the curable composition HC on the other side of the substrate.

In general, in case coating layers are formed on both sides of a substrate, there is a difference in tensions, etc. applied to both sides or upper and lower layers in the process of curing and forming, and thus, both coating layers of the prepared plastic film exhibit property difference, for example, difference in tensile strength, etc. As the result, various properties of the plastic film may be degraded.

Thus, in order to overcome such a problem, (iii) elastic polymer may be further included in any one coating layer among the coating layers formed on both sides of the substrate. That is, on one side of the substrate, a coating layer without (iii) elastic polymer is formed, and on the other side, a coating layer comprising (iii) elastic polymer is formed. A plastic film of such a structure, even if tensions applied to both sides or upper and lower layers in the preparation process are different, may relax force applied from the outside by the coating layer comprising elastic polymer, thus providing a plastic film having excellent properties. And, the coating layer comprising elastic polymer may absorb or offset the external impact applied to the plastic film, thus enhancing impact resistance of the plastic film.

Thus, as the curable composition different from the curable composition HC, a composition comprising (iii) elastic polymer may be used so as to enhance impact resistance of the plastic film according to one embodiment. Specifically, the curable composition different from the curable composition HC may comprise cationically curable compounds, a cationic polymerization initiator, radically curable compounds, a radical polymerization initiator, and elastic polymer. The curable composition different from the curable composition HC is named as IR so as to distinguish from the curable composition HC.

As The cationically curable compounds, cationic polymerization initiator, radically curable compounds, radical polymerization initiator and other additives included in the curable composition IR, the above explained components included in the curable composition HC may be used in the above explained content range. However, while the curable composition HC comprises, based on the total weight of the cationically curable compounds, 60 wt % to 100 wt % of 3,4,3',4'-diepoxybicylcohexyl and forms a coating layer of high cross-linking density at a rapid curing speed, thus realizing high hardness and high transparency, the curable composition IR may comprise less 3,4,3',4'-diepoxybicylcohexyl than the curable composition HC within a range that does not have influence on the enhancement of impact resistance, or may not comprise it. For example, the curable composition IR may comprise 3,4,3',4'-diepoxybicylcohexyl in an appropriate content within 20 wt % to 100 wt %, based on the total weight of the cationically curable compounds.

The curable composition IR may absorb external impact due to the elastic polymer, thus providing a plastic film with more enhanced impact resistance. Particularly, since the plastic film according to one embodiment has a three-dimensional shape, it is vulnerable to external impact compared to a film of a two-dimensional flat shape. Thus, using the curable composition IR comprising elastic polymer, such a disadvantage may be compensated.

In the elastic polymer, functional groups that can be cured by cation or radical (curable functional groups) may be included. Such curable functional groups of the elastic polymer may react with cationically curable compounds or radically curable compounds, and so on, at the time of curing of the curable composition IR, to form cross-links with cationically curable resin or radically curable resin. However, the curable functional groups of such elastic polymer may not cross-link with cationically curable compounds or radically curable compounds, etc, and allow the elastic polymer to be dispersed in cationically curable resin or radically curable resin through the interactions such as hydrogen bonding, etc. with the cationically curable resin or radically curable resin. In addition, the curable functional groups of the elastic polymer may cross-link with each other at the time of curing of the curable composition IR, thus forming polymer with a higher molecular weight. Due to the elastic polymer dispersed in a coating layer in various forms, scratch resistance, abrasion resistance, flexibility and impact resistance of the plastic film may be further improved.

As the elastic polymer, polymer exhibiting elongation of about 50% to 500%, about 100% to 500%, or about 120% to 450%, as measured by ASTM D638, may be used. Such elastic polymer gives excellent impact resistance to the coating layer, thus providing products of various shapes that withstand external impact.

As the elastic polymer, polymer having a weight average molecular weight of about 300 to 30,000 g/mol, about 300 to 20,000 g/mol, about 300 to 10,000 g/mol, about 300 to 5,000 g/mol or about 300 to 2,500 g/mol may be used. Within such ranges, it may give appropriate elasticity to the coating layer, thus improving impact resistance.

Specific kinds of such elastic polymer may include polycaprolactone, polyol, polyurethane acrylate, or polybutadiene, and so on. The polycaprolactone is prepared by ring opening polymerization of caprolactone and is included in the coating layer to compensate the properties such as flexibility, impact resistance, and durability. The polyurethane acrylate comprises an urethane bond, thus improving the properties such as elasticity and durability of the plastic film. The polybutadiene has a low glass transition temperature of −80° C. or less, thus improving the properties such as elasticity and durability, etc. of the plastic film. As the elastic polymer, one kind or two or more kinds of polymers, among the above listed polymers, may be used.

The elastic polymer may be included in the content of 5 to 30 parts by weight, or 7 to 25 parts by weight, based on 100 parts by weight of the curable composition IR. The curable composition IR comprising the elastic polymer in the above explained content range may provide a plastic film that not only exhibits excellent properties such as high hardness, high transparency, etc., but also exhibits excellent impact resistance.

In the preparation method according to another embodiment, the curable composition IR may be used as follows.

For example, the curable composition IR, when the curable composition HC is coated on one side of the substrate, may be coated on the other side of the substrate; or it may be first coated on one side of the substrate, and then, the curable composition HC may be coated on the other side of the substrate; or the curable composition HC may be coated on one side of the substrate, and then, it may be coated on the other side of the substrate. The curable composition IR may also be coated to a thickness of the above explained range, similarly to the curable composition HC. And, the side on which the curable composition IR is coated may be partially cured in the same method as the side on which the curable composition HC is coated, and the film having different semi-cured coating layers on both sides may be thermoformed and heat cured to provide a plastic film with enhanced impact resistance.

And, for another example, any one curable composition among the curable composition HC or curable composition IR may be coated on one side of the substrate, and partially photocured to form a semi-cured coating layer, and then, the other curable composition may be coated on the other side of the substrate, and partially photocured to form a semi-cured coating layer. Thereafter, the film having different semi-cured coating layers on both sides may be thermoformed and heat cured to provide a plastic film with enhanced impact resistance.

Specifically, in the plastic film prepared using the curable composition IR as explained above, on one side of the substrate, a coating layer comprising (i) cationically curable resin, which is a cured product of cationically curable compounds comprising, based on the total weight of the cationically curable compounds, 60 wt % to 100 wt % of 3,4,3',4'-diepoxybicyclohexyl, and (ii) radically curable resin, may be formed, and on the other side of the substrate, a coating layer comprising (i) cationically curable resin, which is a cured product of cationically curable compounds comprising, based on the total weight of the cationically curable compounds, 20 wt % to 100 wt % of 3,4,3',4'-diepoxybicyclohexyl, (ii) radically curable resin, and (iii) elastic polymer, may be formed.

Such a plastic film may maintain excellent surface hardness, scratch resistance and abrasion resistance due to the high hardness coating layer formed on one side of the substrate, and may exhibit excellent impact resistance due to the coating layer that can absorb impact, formed on the other side of the substrate.

Meanwhile, the plastic film according to one embodiment has an at least partially curved shape. As used herein, the "at least partially curved shape" means a shape in which at least a part of the cross section of the thickness direction of the film is curved.

Specifically, the plastic film may have a shape in which, among four edges, two facing edges are curved, or a shape in which four edges are all curved; or a generally curved shape.

More specifically, the plastic film of a shape in which, among four edges, two facing edges are curved, may have a shape as shown in FIG. 1. FIG. 1 is a perspective view of the plastic film (1) according to one embodiment, and FIG. 2 is a cross sectional view showing the cross section of the plastic film (1) when cut to the thickness direction along the line connecting T and T' of FIG. 1.

As shown in FIG. 1 and FIG. 2, the plastic film (1) comprising a substrate (10) and coating layer (20, 30) formed on both sides of the substrate (10) may have a shape in which, among four edges, two facing edges are curved. And, since the plastic film is formed using the above explained curable composition HC by the above explained preparation method, it may have curved parts with a wide range of radii of curvature without generation of crack or curl. For example, in the plastic film of a shape in which, among four edges, two facing edges are curved, the radius of curvature (R1, R2) of each edge may be the same or different, and each independently, may be 2.5 to 15. And, in the plastic film of a shape in which, among four edges, two facing edges are curved, the angles (θ1, θ2) made by the front part and the side part may be the same or different, and each independently, may be greater than 0° and 90° or less. The radii of curvature and angles may be modified according to the desired shape of a plastic film within the above explained range.

A plastic film of a shape in which four edges are all curved, may have a shape as shown in FIG. 3. FIG. 3 is a perspective view of the plastic film (300) according to another embodiment, and FIG. 4 (a) is a cross section view showing the cross section of the plastic film (100) when cut to the thickness direction along the line connecting T1 and T1' of FIG. 3, and (b) is cross section view showing the cross section of the plastic film (100) when cut to the thickness direction along the line connecting T2 and T2' of FIG. 3a As shown in FIG. 3 and FIG. 4, the plastic film (1) comprising a substrate (40) and coating layers (50, 60) formed on both sides of the substrate (40) may have a shape in which, four edges are all curved. The plastic film of such a shape may have curved parts with a wide range of radii of curvature without generation of crack or curl, similarly to the plastic film of the above explained shape. For example, in the plastic film of a shape in which four edges are all curved, the radius of curvature (R3, R4, R5, R6) of each edge may be the same or different, and each independently, may be 2.5 to 15. And, in the plastic film of a shape in which four edges are all curved, the angles (θ3, θ4, θ5, θ6) made by the front part and the side part may be the same or different, and each independently, may be greater than 0° and 90° or less. The radii of curvature and angles may be modified according to the desired shape of a plastic film within the above explained range.

The plastic film of a generally curved shape may have a shape as shown in FIG. 5. FIG. 5 is a perspective view of the plastic film (200) according to yet another embodiment, and FIG. 6 is a cross sectional view showing the cross section of the plastic film (200) when cut to the thickness direction along the line connecting T3 and T3' of FIG. 5.

As shown in FIG. 5 and FIG. 6, the plastic film (200) comprising a substrate (70) and coating layers (80, 90) formed on both sides of the substrate (70) may have a generally curved shape. The plastic film of such a shape may have curved parts with wide range of radii of curvatures without generation of crack or curl, similarly to the plastic films of the above explained shapes. For example, the plastic film of a generally curved shape may have a radius of curvature of 2.5 to 900. The radius of curvature may be modified according to the desired shape of a plastic film within the above range.

Although the shapes of the plastic film according to the embodiments of the present invention have been explained in detail with reference to FIG. 1 to FIG. 6, the shape of the plastic film of the present invention is not limited thereto.

The plastic film prepared using the curable composition HC by the above explained method exhibits high hardness, impact resistance, flexibility, scratch resistance, high transparency, durability, light resistance, high transmittance, etc., and thus, can be usefully used in various fields. Particularly, the plastic film not only exhibits high hardness and abrasion resistance of glass level, but also is light and is not easily broken, and thus, it is expected to be variously utilized as new material that can be used instead of glass.

Hereinafter, the actions and effects of the present invention will be explained in more detail through specific examples. However, these are presented only as the illustration of the invention, and the scope of the invention is not limited thereto.

Example 1: Preparation of a Curable Composition and a Plastic Film Using the Same 80 g of 3,4,3',4'-diepoxybicyclohexyl as a cationically curable compound, 0.5 g of SI-100 L (manufactured by sanshin), 20 g of a mixture of pentaerythritol triacrylate and pentaerythritol tetraacrylate as radically curable compounds, and 1 g of Irgacure 184 (manufactured by BASF) were mixed to prepare a curable composition.

The curable composition was coated on a polycarbonate substrate with a width of 15 cm, a length of 20 cm and a thickness of 500 μm. And, to the obtained coated film, UV of about 200 mJ/cm$^2$ was irradiated using a metal halide lamp to obtain a semi-cured coating layer with a thickness of 100 μm.

Subsequently, the semi-cured coating layer was positioned between male and female molds that bend both facing edges to 5R, 90 degree curve, and was left at a temperature of 100 to 130° C. for 2 minutes. Thereafter, the male and female molds were laminated with a pressure of 700 to 800 kgf/cm$^2$. While the laminating was completed, it was maintained for 3 minutes to conduct a heat curing and thermoforming process. As the result, a plastic film having a three-dimensional structure in which both facing edges are 5R, 90 degree curved, was prepared.

Example 2: Preparation of a Curable Composition and a Plastic Film Using the Same A curable composition was prepared by the same method as Example 1, except using 60 g of 3,4,3',4'-diepoxybicyclohexyl and 20 g of celloxide 2021P (manufactured by Daicel) as cationically curable compounds in Example 1, and a plastic film was prepared using the same.

Example 3: Preparation of a Curable Composition and a Plastic Film Using the Same A curable composition was prepared by the same method as Example 1, except using 40 g of 3,4,3',4'-diepoxybicyclohexyl and 20 g of celloxide 2021P (manufactured by Daicel) as cationically curable compounds, and using 40 g of a mixture of pentaerythritol triacrylate and pentaerythritol tetraacrylate as radically curable compounds in Example 1, and a plastic film was prepared using the same.

Example 4: Preparation of a Curable Composition and a Plastic Film Using the Same 7 g of 3,4,3',4'-diepoxybicyclohexyl and 3 g of celloxide 2021P (manufactured by Daicel) as cationically curable compounds, 0.05 g of SI-B3A (manufactured by sanshin), 3 g of a mixture of pentaerythritol triacrylate and pentaerythritol tetraacrylate as radically curable compounds, 0.1 g of Irgacure 184 (manufactured by BASF), 0.05 g of fluorine-containing surfactant (product name F477), and 0.02 g of TNPP (tris(nonylphenyl) phosphite) as antioxidant were mixed to prepare a curable composition.

The curable composition was coated on a polycarbonate substrate with a width of 15 cm, a length of 20 cm and a thickness of 500 µm. And, to the obtained coated film, UV of about 200 mJ/cm$^2$ was irradiated using a lamp capable of irradiating UV of 290 to 320 nm wavelength to obtain a second semi-cured coating layer with a thickness of 100 µm.

And, on the opposite side of the substrate, the curable composition was coated by the same method as explained above, and photocured to obtain a semi-cured coating layer with a thickness of 100 µm.

Subsequently, the film having semi-cured coating layers on both sides was positioned between male and female molds that bend both facing edges to 5R, 90 degree curve, and was left at a temperature of 100 to 130° C. for 2 minutes. Thereafter, the male and female molds were laminated with a pressure of 700 to 800 kgf/cm$^2$.

While the laminating was completed, it was maintained for 3 minutes to conduct a heat curing and thermoforming process. As the result, a plastic film having a three-dimensional structure in which both facing edges are 5R, 90 degree curved, was prepared.

Example 5: Preparation of a Curable Composition and a Plastic Film Using the Same 7 g of 3,4,3',4'-diepoxybicyclohexyl and 3 g of celloxide 2021P (manufactured by Daicel) as cationically curable compounds, 0.05 g of SI-B3A (manufactured by sanshin), 3 g of a mixture of pentaerythritol triacrylate and pentaerythritol tetraacrylate as radically curable compounds, 0.1 g of Irgacure 184 (manufactured by BASF), 0.05 g of fluorine-containing surfactant (product name F477), and 0.02 g of TNPP (tris(nonylphenyl) phosphite) as antioxidant were mixed to prepare a first curable composition.

Meanwhile, 7 g of 3,4,3',4'-diepoxybicyclohexyl and 3 g of celloxide 2021P (manufactured by Daicel) as cationically curable compounds, 0.07 g of SI-B3A (manufactured by sanshin), 3 g of trimethylolpropane triacrylate as radically curable compounds, 0.1 g of Irgacure 184 (manufactured by BASF), 0.05 g of fluorine-containing surfactant (product name F477), and 0.02 g of TNPP (tris(nonylphenyl) phosphite) as antioxidant were mixed to prepare a second curable composition.

The second curable composition was coated on a polycarbonate substrate with a width of 15 cm, a length of 20 cm and a thickness of 500 µm. And, to the obtained coated film, UV of about 200 mJ/cm$^2$ was irradiated using a lamp capable of irradiating UV of 290 to 320 nm wavelength to obtain a second semi-cured coating layer with a thickness of 100 µm.

And, on the opposite side of the substrate, the first curable composition was coated by the same method as explained above, and photocured to obtain a first semi-cured coating layer with a thickness of 100 µm.

Subsequently, the film having first and second semi-cured coating layers was positioned between male and female molds that bend two facing edges to 5R, 90 degree curve, and was left at a temperature of 100 to 130° C. for 2 minutes. Thereafter, the male and female molds were laminated with a pressure of 700 to 800 kgf/cm$^2$.

While the laminating was completed, it was maintained for 3 minutes to conduct a heat curing and thermoforming process. As the result, a plastic film having a three-dimensional structure in which two facing edges are 5R, 90 degree curved, was prepared.

Comparative Example 1: Preparation of a Curable Composition and a Plastic Film Using the Same A curable composition was prepared by the same method as Example 1, except using 4,4'-bis[di(β-hydroxyethoxy)phenylsulfonio]phenylsulfide bishexafluoroantimonate instead of SI-100L (manufactured by sanshin) in Example 1.

The curable composition was coated on a polycarbonate substrate with a width of 15 cm, a length of 20 cm and a thickness of 500 µm. And, to the obtained coated film, UV of about 200 mJ/cm$^2$ was irradiated using a metal halide lamp to obtain a semi-cured coating layer with a thickness of 100 µm.

Subsequently, the semi-cured coating layer was positioned between male and female molds that bend both facing edges to 5R, 90 degree curve, and was left at a temperature of 100 to 130° C. for 2 minutes. Thereafter, the male and female molds were laminated with a pressure of 700 to 800 kgf/cm$^2$. While the laminating was completed, it was maintained for 3 minutes to conduct a thermoforming process. At the curved part of the obtained plastic film, cracks were detected.

Comparative Example 2: Preparation of a Curable Composition and a Plastic Film Using the Same A curable composition was prepared by the same method as Example 1, except that the content of 3,4,3',4'-diepoxybicyclohexyl was reduced from 80 g to 40 g, and bis(2-ethylhexyl)-4,5-epoxyhexahydrophthalate was used as much as the reduced content of 3,4,3',4'-diepoxybicyclohexyl, and a plastic film was prepared using the same.

Experimental Example: Evaluation of Plastic Film (1) Pencil Hardness

The pencil hardnesses of the plastic films prepared in Examples and Comparative Examples were measured according to ASTM D3363-74. Specifically, the surface of the plastic film was drawn one time under a load of 1.0 kgf using a pencil hardness tester. For each plastic film, the highest hardness without flaw was confirmed, and this test was repeated 5 times to calculate the mean value.

(2) Thermoformability

After thermoforming, the flat part of the plastic film was compared with the surface of a mold to observe whether or not deformation occurred, and it was observed whether or not cracks were formed at the curved part of the plastic film. As the result of observation, if there is no deformation on the flat part of the plastic film and there is no crack at the curved part, it was indicated as 'excellent' in the following Table 1, and if there is a deformation on the flat part of the plastic film or there is a crack at the curved part, indicated as 'faulty' in the following Table 1.

(3) Tackness

After semi-cured and before thermoformed, peel strength of the semi-cured coating layer to the polycarbonate substrate was measured using a texture analyzer (Stable Micro System, UK) under conditions of 50 mm/min peel speed and 90° peel angle.

As the result, if the peel strength is less than 0.1 N/2 cm, it was indicated as 'very excellent', if the peel strength is 0.1 N/2 cm or more and less than 0.5 N/2 cm, indicated as 'excellent', if the peel strength is 0.5 N/2 cm or more and less than 1.0 N/2 cm, indicated as 'good', and if the peel strength is 1.0 N/2 cm or more, indicated as 'faulty'.

(4) Light Resistance

The plastic films prepared in Examples and Comparative Examples were exposed to UV of UVB wavelength region for 72 hours or more, and then, a difference in color b*before and after exposure to UV was measured.

(5) Transmittance and Haze

Transmittance and haze were measured using a spectrophotometer (apparatus name: COH-400).

The results of property measurement are shown in the following Table 1.

without generation of cracks or curls, due to the low tackness and excellent thermoformability in the semi-cured state.

To the contrary, the curable composition used in Comparative Example 2 had a low curing speed and failed to form a coating layer of high cross-linking density, and thus, the plastic film prepared according to Comparative Example 2 exhibited low hardness and high haze. And, although Comparative Example 1 wherein a cationic photopolymerization initiator generating acid by light was used provided a plastic film with high hardness and low haze, cracks were detected at the curved part of the plastic film. Thus, it is confirmed that the curable composition of Comparative Example 1 cannot provide a plastic film of a three-dimensional shape.

Example 6: Preparation of a Curable Composition and a Plastic Film Using the Same 7 g of 3,4,3',4'-diepoxybicyclohexyl and 3 g of celloxide 2021P (manufactured by Daicel) as cationically curable compounds, 0.05 g of SI-B3A (manufactured by sanshin), 3 g of a mixture of pentaerylthritol triacrylate and pentaerythritol tetraacrylate as radically curable compounds, 0.1 g of Irgacure 184 (manufactured by BASF), 0.05 g of fluorine-containing surfactant (product name F477), and 0.02 g of TNPP (tris(nonylphenyl) phosphite) as antioxidant were mixed to prepare a first curable composition.

Meanwhile, 3 g of 3,4,3',4'-diepoxybicyclohexyl and 7 g of celloxide 2021P (manufactured by Daicel) as cationically curable compounds, 0.07 g of SI-B3A (manufactured by sanshin), 2.5 g of trimethylolpropane triacrylate as radically curable compounds, 0.1 g of Irgacure 184 (manufactured by BASF), 2 g of polycaprolactone triol (product name PLACCEL 305, elongation measured by ASTM D638 150%, weight average molecular weight 550 g/mol) as elastic polymer, 0.05 g of fluorine-containing surfactant (product name F477), and 0.02 g of TNPP (tris(nonylphenyl) phosphite) as antioxidant were mixed to prepare a second curable composition.

The second curable composition was coated on a polycarbonate substrate with a width of 15 cm, a length of 20 cm and a thickness of 500 μm. And, to the obtained coated film,

TABLE 1

|  | Example 1 | Example 2 | Example 3 | Example 4 | Example 5 | Comparative Example 1 | Comparative Example 2 |
|---|---|---|---|---|---|---|---|
| Pencil hardness | 6H | 6H | 5H | 6H | 5H | 5H | H |
| Tackiness | Very excellent | Very excellent | Very excellent | Very excellent | Very excellent | Very excellent | Good |
| Thermoformability | excellent | excellent | excellent | excellent | excellent | Faulty | excellent |
| Light resistance | 1.8 | 2.1 | 1.6 | 1.6 | 1.2 | 2.1 | 1.5 |
| transmittance [%] | 91.50 | 91.5 | 91.67 | 91.32 | 92.00 | 91.12 | 92.40 |
| haze[%] | 0.37 | 0.37 | 0.42 | 0.48 | 0.50 | 0.38 | 1.3 |

Referring to Table 1, the plastic films prepared according to Examples 1 to 6 exhibited not only high hardness but also low haze. Thus, it is confirmed that the curable composition according to one embodiment of the present invention is sufficiently cured during the thermoforming process to realize high hardness by the fast curing speed. It is also confirmed that the curable compositions used in Examples 1 to 5 provide plastic films of a three-dimensional shape UV of about 400 mJ/cm$^2$ was irradiated using a lamp capable of irradiating UV of 290 to 320 nm wavelength to obtain a second semi-cured coating layer with a thickness of 100 μm.

And, on the opposite side of the substrate, the first curable composition was coated by the same method as explained above, and photocured to obtain a first semi-cured coating layer with a thickness of 100 μm.

Subsequently, the film having first and second semi-cured coating layers was positioned between male and female molds that bend both facing edges to 5R, 90 degree curve, and was left at a temperature of 100 to 130° C. for 2 minutes. Thereafter, the male and female molds were laminated with a pressure of 700 to 800 kgf/cm².

While the laminating was completed, it was maintained for 3 minutes to conduct a heat curing and thermoforming process. As the result, a plastic film having a three-dimensional structure in which two facing edges are 5R, 90 degree curved, was prepared.

Example 7: Preparation of a Curable Composition and a Plastic Film Using the Same 5 g of 3,4,3',4'-diepoxybicyclohexyl and 5 g of celloxide 2021P (manufactured by Daicel), 0.07 g of SI-B3A (manufactured by sanshin), 2 g of trimethylolpropane triacrylate, 0.1 g of Irgacure 184 (manufactured by BASF), 3 g of polycaprolactone diol (product name PLACCEL 205, elongation measured by ASTM D638 135%, weight average molecular weight 530 g/mol) as elastic polymer, 0.05 g of fluorine-containing surfactant (product name F477), and 0.02 g of TNPP (tris(nonylphenyl) phosphite) as antioxidant were mixed to prepare a second curable composition.

A plastic film was prepared by the same method as Example 6, except using the composition prepared above as the second curable composition in Example 6.

Example 8: Preparation of a Curable Composition and a Plastic Film Using the Same 8 g of 3,4,3',4'-diepoxybicyclohexyl and 2 g of celloxide 2021P (manufactured by Daicel), 0.07 g of SI-B3A (manufactured by sanshin), 2 g of a mixture of pentaerythritol triacrylate and pentaerythritol tetraacrylate, 0.1 g of Irgacure 184 (manufactured by BASF), 2 g of polycaprolactone tetraol (product name PLACCEL 410, elongation measured by ASTM D638 190%, weight average molecular weight 1000 g/mol) as elastic polymer, 0.05 g of fluorine-containing surfactant (product name F477), and 0.02 g of TNPP (tris (nonylphenyl) phosphite) as antioxidant were mixed to prepare a second curable composition.

A plastic film was prepared by the same method as Example 6, except using the composition prepared above as the second curable composition in Example 6.

Example 9: Preparation of a Curable Composition and a Plastic Film Using the Same 8 g of 3,4,3',4'-diepoxybicyclohexyl and 2 g of celloxide 2021P (manufactured by Daicel), 0.07 g of SI-B3A (manufactured by sanshin), 2 g of a mixture of pentaerythritol triacrylate and pentaerythritol tetraacrylate, 0.1 g of Irgacure 184 (manufactured by BASF), 2 g of urethane acrylate-based polymer (product name TA604AU, elongation measured by ASTM D638 170%, weight average molecular weight 580 g/mol) as elastic polymer, 0.05 g of fluorine-containing surfactant (product name F477), and 0.02 g of TNPP (tris(nonylphenyl) phosphite) as antioxidant were mixed to prepare a second curable composition.

A plastic film was prepared by the same method as Example 6, except using the composition prepared above as the second curable composition in Example 6.

Example 10: Preparation of a Curable Composition and a Plastic Film Using the Same 4 g of 3,4,3',4'-diepoxybicyclohexyl and 6 g of celloxide 2021P (manufactured by Daicel), 0.07 g of SI-B3A (manufactured by sanshin), 3 g of trimethylolpropane triacrylate, 0.1 g of Irgacure 184 (manufactured by BASF), 2 g of polybutadiene (product name BR4010, elongation measured by ASTM D638 400%, weight average molecular weight 2000 g/mol) as elastic polymer, 0.05 g of fluorine-containing surfactant (product name F477), and 0.02 g of TNPP (tris (nonylphenyl) phosphite) as antioxidant were mixed to prepare a second curable composition.

A plastic film was prepared by the same method as Example 6, except using the composition prepared above as the second curable composition in Example 6.

Experimental Example 2: Evaluation of Plastic Films

The plastic films prepared in Examples 6 to 10 were evaluated by the method described in Experimental Example 1, and the results are described in Table 2. Specifically, light resistance is the test results of the second coating layers of the plastic films, and thermoformability, transmittance and haze are the test results of the whole plastic films.

And, for the plastic films prepared in Examples 6 to 10, scratch resistance and impact resistance were additionally evaluated by the method described below, and the results are shown in the following Table 2.

(1) Scratch Resistance

After loading a steel wool (#0000) in a friction tester, it was moved back and forth 400 times under a load of 0.5 kg against the first coating layer, and then, the number of flaws was evaluated. If flaws are less than 2, scratch resistance was evaluated as 'excellent, if flaws are greater than 2 and less than 5, evaluated as 'good', and if flaws are greater than 5, evaluated as 'faulty'.

(2) Impact Resistance

When a steel ball of 22 g was dropped repeatedly 10 times to the first coating layer from a 50 cm height, it was observed whether or not crack was generated, and if crack was not generated, impact resistance is evaluated as 'excellent', and if crack was generated, evaluated as 'faulty'.

TABLE 2

| | Example 6 | Example 7 | Example 8 | Example 9 | Example 10 |
|---|---|---|---|---|---|
| Thermoformability | Excellent | Excellent | Excellent | Excellent | Excellent |
| Light resistance | 1.5 | 1.3 | 2.1 | 1.2 | 1.1 |
| transmittance [%] | 92.10 | 91.66 | 91.31 | 91.11 | 91.33 |
| Haze %] | 0.40 | 0.38 | 0.41 | 0.45 | 0.50 |
| Scratch resistance | Excellent | Excellent | Excellent | Excellent | Excellent |
| Impact resistance | Excellent | Excellent | Excellent | Excellent | Excellent |

Referring to Table 2, it is confirmed that the plastic films of Examples 6 to 10, even if prepared in curved shapes, exhibit excellent impact resistance together with excellent properties.

EXPLANATION OF REFERENCE NUMERALS 1, 100, 200: A plastic film
10, 40, 70: A substrate
20, 30, 50, 60, 80, 90: A coating layer

The invention claimed is:

1. A plastic film of at least partially curved shape, comprising:
    a substrate,
    a coating layer formed on one side of the substrate, said coating layer comprising (i) cationically curable resin, which is a cured product of cationically curable compounds comprising, based on the total weight of the cationically curable compounds, 60 wt % to 100 wt % of 3,4,3',4'-diepoxybicyclohexyl, and (ii) radically curable resin, and
    a coating layer formed on the other side of the substrate, said coating layer comprising (i) cationically curable resin, which is a cured product of cationically curable compounds comprising, based on the total weight of the cationically curable compounds, 20 wt % to 100 wt % of 3,4,3',4'-diepoxybicyclohexyl, (ii) radically curable resin, and (iii) elastic polymer.

2. The plastic film according to claim 1, wherein the glass transition temperature of the substrate is 80 to 250° C.

3. The plastic film according to claim 1, wherein the cationically curable resin is a cured product obtained by heat curing of cationically curable compounds by a cationic polymerization initiator comprising a cation of Chemical Formula 1:

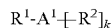     [Chemical Formula 1]

in Chemical Formula 1,
$A^1$ is N, P or S,
$R^1$ is a C1-20 alkyl or a C2-20 alkenyl radical,
$R^2$ is a C1-20 alkyl, a C2-20 alkenyl, a C6-30 aryl, a C7-35 alkylaryl or a C7-35 arylalkyl, or a radical in which a hydroxyl, a C1-20 alkyl, a C2-20 alkenyl, a C6-30 aryl, a C7-35 alkylaryl, or a C7-35 arylalkyl is linked to the above radical by a single bond, —O—, —S—, —CO—, —COO— or —OCO—, and
k is 2 or 3.

4. The plastic film according to claim 1, wherein the radically curable resin is a cured product of multifunctional acrylate.

5. The plastic film according to claim 4, wherein the multifunctional acrylate comprises one or more selected from the group consisting of hexanediol diacrylate, hexanediol dimethacrylate, tripropyleneglycol diacrylate, tripropyleneglycol dimethacrylate, ethyleneglycol diacrylate, ethyleneglycol dimethacrylate, trimethylolpropane triacrylate, trimethylolpropane trimethacrylate, trimethylolpropane ethoxylate triacrylate, glycerin propoxylate triacrylate, pentaerythritol triacrylate, pentaerythritol trimethacrylate, pentaerythritol tetraacrylate, pentaerythritol tetramethacrylate, dipentaerythritol hexaacrylate and dipentaerythritol hexamethacrylate.

6. The plastic film according to claim 1, wherein pencil hardness of the coating layer under a load of 1.0 kg is 4H or more, when the thickness of the coating layer is 100 μm.

7. The plastic film according to claim 1, wherein haze of the coating layer is 1% or less, when the thickness of the coating layer is 100 μm.

8. The plastic film according to claim 1, wherein the plastic film has a shape in which, among four edges, two facing edges are curved, a shape in which all four edges are curved, or a generally curved shape.

9. The plastic film according to claim 1, wherein the plastic film is used instead of glass.

* * * * *